United States Patent
Gopalarathnam et al.

(10) Patent No.: US 12,292,873 B2
(45) Date of Patent: May 6, 2025

(54) PRIORITIZED HASH TABLE

(71) Applicant: DELL PRODUCTS L.P., Round Rock, TX (US)

(72) Inventors: Sudharsan Dhamal Gopalarathnam, Bothell, WA (US); Karthik Krishnamurthy, Chennai (IN); Anbalagan Natchimuthu, Chennai (IN)

(73) Assignee: DELL PRODUCTS L.P., Round Rock, TX (US)

( * ) Notice: Subject to any disclaimer, the term of this patent is extended or adjusted under 35 U.S.C. 154(b) by 458 days.

(21) Appl. No.: 17/234,063

(22) Filed: Apr. 19, 2021

(65) Prior Publication Data

US 2022/0335029 A1    Oct. 20, 2022

(51) Int. Cl.
    *G06F 16/22*    (2019.01)
    *G06F 9/455*    (2018.01)

(52) U.S. Cl.
    CPC ...... *G06F 16/2255* (2019.01); *G06F 9/45533* (2013.01)

(58) Field of Classification Search
None
See application file for complete search history.

(56) References Cited

U.S. PATENT DOCUMENTS

| | | | | |
|---|---|---|---|---|
| 2009/0158006 A1* | 6/2009 | Nam | ...................... | H04L 45/742 |
| | | | | 711/216 |
| 2011/0292206 A1* | 12/2011 | Newton | .............. | H04L 12/4641 |
| | | | | 348/143 |
| 2012/0163797 A1* | 6/2012 | Wang | ...................... | H04L 45/62 |
| | | | | 398/2 |
| 2014/0215047 A1* | 7/2014 | Li | ........................ | H04L 49/9084 |
| | | | | 709/223 |
| 2014/0334494 A1* | 11/2014 | Lin | ......................... | H04L 49/70 |
| | | | | 370/400 |
| 2015/0149989 A1* | 5/2015 | Lu | ............................ | G06F 8/61 |
| | | | | 717/170 |
| 2016/0182373 A1* | 6/2016 | Wang | ...................... | H04L 69/22 |
| | | | | 370/392 |
| 2019/0005148 A1* | 1/2019 | Lam | ....................... | H04W 28/16 |
| 2019/0149463 A1* | 5/2019 | Bajaj | ...................... | H04L 61/103 |
| | | | | 370/401 |

(Continued)

OTHER PUBLICATIONS

Shepler, et al., "VXLAN and BGP EVPN Configuration Guide for Dell EMC SmartFabric OS10," Release 10.5.0, DELLEMC, Jun. 2020.

(Continued)

*Primary Examiner* — Polina G Peach
*Assistant Examiner* — Anugeetha Kunjithapatham
(74) *Attorney, Agent, or Firm* — BAUGH LAW, LLC

(57) ABSTRACT

Hash collision in a highly scaled configuration cannot be prevented. However, the impact of the hash collision may be reduced based on a priority. Currently, there are no priorities assigned to virtual ports (VP) in a VXLAN environment. Thus, any VP may be impacted by not being added to a hash table that facilitates network data traffic processing. The probability of not being added to a hash table for network VPs is higher given that they tend to be programmed at a later stage than access VP. With priority-based hash table programming embodiments, hash table programming is better controlled, and the impact to higher priority VPs is reduced.

20 Claims, 6 Drawing Sheets

(56) References Cited

U.S. PATENT DOCUMENTS

2020/0328905 A1* 10/2020 Yeh .......................... H04L 67/60
2021/0168125 A1*  6/2021 Vemulpali ............. H04L 9/3236

OTHER PUBLICATIONS

[Online], [Retrieved Oct. 26, 2022]. Retrieved from Internet <URL:. https://www.dell.com/support/manuals/en-us/dell-emc-smartfabric-os10/vxlan-evpn-ug-pub/bgp-evpn-for-vxlan?guid=guid-8a071396-e08a-491f-b94a-97a463559df1 &lang=en-us> (164 pgs).

* cited by examiner

PRIORITIZED HASH TABLE

BACKGROUND

A. Technical Field

The present disclosure relates generally to information handling systems. More particularly, the present disclosure relates to prioritized port management.

B. Background

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use, such as financial transaction processing, airline reservations, enterprise data storage, or global communications. In addition, information handling systems may include a variety of hardware and software components that may be configured to process, store, and communicate information and may include one or more computer systems, data storage systems, and networking systems.

As data centers and networks expand (both in size and in geographic deployment), different technologies have been developed to help configure and manage these vast networks. One such technology is virtual extensible local area networks (VXLANs). A VXLAN extends Layer 2 (L2) server connectivity over an underlying Layer 3 (L3) internet protocol (IP) transport network in a virtualized data center. Stated differently, a VXLAN is a type of network virtualization overlay that encapsulates a payload into IP packets for transport across the IP underlay network. A virtualized data center typically comprises virtual machines (VMs) in a multi-tenant environment.

VXLAN tunnel endpoints (VTEPs) are used to encapsulate/de-encapsulate VXLAN headers for the traffic between end hosts. A VTEP is an information handling system (e.g., a switch) that is connected to end hosts and to the IP network, thereby providing network connectivity to its connected end hosts. A VTEP comprises two types of virtual ports (VPs)—access virtual ports and network virtual ports. The access VPs are used to connect to access devices (e.g., host systems), while the network VPs are used to connect to other VTEPs via a network.

A VTEP maintains in its network firmware/hardware a VLAN translation hash table of entries that help facilitate processing of data traffic. The entries in the hash table are done via a hash function and are entered in a first-come basis—the entries that come in first get programmed. Later entries might have a hash collision, which leaves them unprogrammed. Also, access VPs and network VPs are maintained in the same hash table. Thus, access VPs and network VPs contend for the VLAN translation hash table. This scenario significantly affects network VPs given that most VXLAN deployments use Ethernet Virtual Private Network (EVPN) and network VPs get programmed dynamically, which comes later than access VPs, which are statically programmed.

However, it should be noted that the importance of a network VP is not the same as an access VP. The impact of losing a network VP is significantly higher than losing an access VP. An access VP loss leads to disruption of traffic to an end device, while a network VP loss impacts traffic between entire sets of devices (e.g., between network server racks). This problem can be observed in at least topologies with scaled VXLAN deployments.

Accordingly, what is needed are systems and methods that address programming issues for virtual ports in a VXLAN topology.

BRIEF DESCRIPTION OF THE DRAWINGS

References will be made to embodiments of the disclosure, examples of which may be illustrated in the accompanying figures. These figures are intended to be illustrative, not limiting. Although the accompanying disclosure is generally described in the context of these embodiments, it should be understood that it is not intended to limit the scope of the disclosure to these particular embodiments. Items in the figures may not be to scale.

DETAILED DESCRIPTION OF EMBODIMENTS

Figure 1:
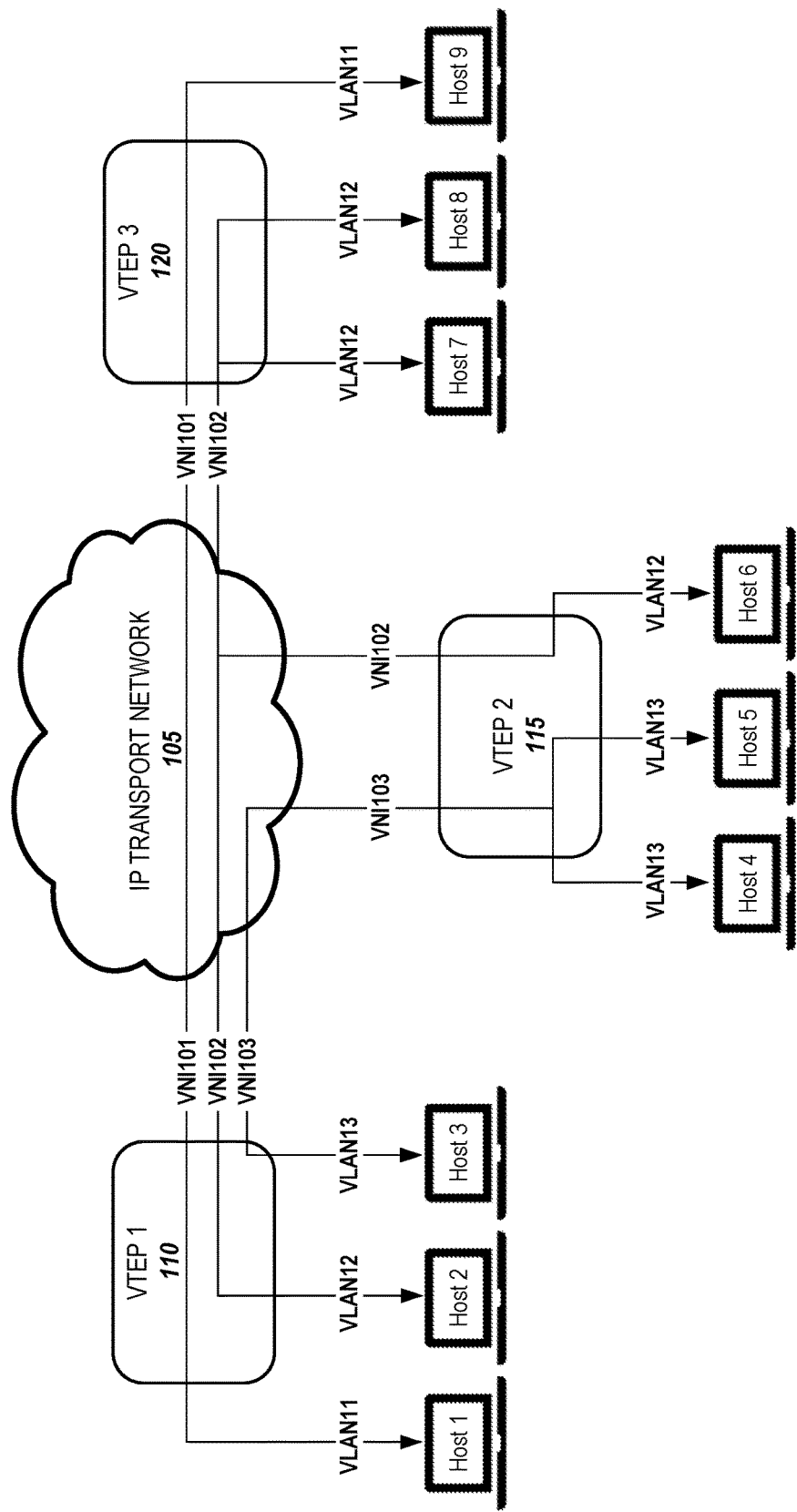
FIG. 1 depicts an example VXLAN topology or network, according to embodiments of the present disclosure.

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system/device, or a method on a tangible computer-readable medium.

Components, or modules, shown in diagrams are illustrative of exemplary embodiments of the disclosure and are meant to avoid obscuring the disclosure. It shall also be understood that throughout this discussion that components may be described as separate functional units, which may comprise sub-units, but those skilled in the art will recognize that various components, or portions thereof, may be divided into separate components or may be integrated together, including, for example, being in a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," "communicatively coupled," "interfacing," "interface," or any of their derivatives shall be understood to include direct connections, indirect connections through one or more intermediary devices, and wireless connections. It shall also be noted that any communication, such as a signal, response, reply, acknowledgement, message, query, etc., may comprise one or more exchanges of information.

Reference in the specification to "one or more embodiments," "preferred embodiment," "an embodiment," "embodiments," or the like means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. The terms "include," "including," "comprise," and "comprising" shall be understood to be open terms, and any examples are provided by way of illustration and shall not be used to limit the scope of this disclosure.

A service, function, or resource is not limited to a single service, function, or resource; usage of these terms may refer to a grouping of related services, functions, or resources, which may be distributed or aggregated. The use of memory, database, information base, data store, tables, hardware, cache, and the like may be used herein to refer to system component or components into which information may be entered or otherwise recorded. The terms "data," "information," along with similar terms, may be replaced by other terminologies referring to a group of one or more bits, and may be used interchangeably. The terms "packet" or "frame" shall be understood to mean a group of one or more bits. The term "frame" shall not be interpreted as limiting embodiments of the present invention to Layer 2 networks; and, the term "packet" shall not be interpreted as limiting embodiments of the present invention to Layer 3 networks. The terms "packet," "frame," "data," or "data traffic" may be replaced by other terminologies referring to a group of bits, such as "datagram" or "cell." The words "optimal," "optimize," "optimization," and the like refer to an improvement of an outcome or a process and do not require that the specified outcome or process has achieved an "optimal" or peak state.

It shall be noted that: (1) certain steps may optionally be performed; (2) steps may not be limited to the specific order set forth herein; (3) certain steps may be performed in different orders; and (4) certain steps may be done concurrently.

Any headings used herein are for organizational purposes only and shall not be used to limit the scope of the description or the claims. Each reference/document mentioned in this patent document is incorporated by reference herein in its entirety.

It shall also be noted that although embodiments described herein may be within the context of virtual ports in a VXLAN topology, aspects of the present disclosure are not so limited. Accordingly, the aspects of the present disclosure may be applied or adapted for use in other contexts.

A. General Overview

As data centers and networks expand (both in size and in geographic deployment), different technologies have been developed to help configure and manage these vast networks. One such technology is virtual extensible local area networks (VXLANs). A VXLAN extends Layer 2 (L2) server connectivity over an underlying Layer 3 (L3) internet protocol (IP) transport network in a virtualized data center. Stated differently, a VXLAN is a type of network virtualization overlay that encapsulates a payload into IP packets for transport across the IP underlay network. A virtualized data center typically comprises virtual machines (VMs) in a multi-tenant environment.

FIG. 1 depicts an example VXLAN topology or network, according to embodiments of the present disclosure. As illustrated, various host systems utilize an IP network 105 to communicate with other host systems. The host systems may be members of different VLANS (e.g., VLAN11, VLAN12, or VLAN13). These server VLAN segments communicate through the extended L2 forwarding domain using VXLAN tunnels. As illustrated, a VXLAN may be associated with a VXLAN network identifier (VNI). A VNI is an identifier, typically a 24-bit ID number, that identifies a tenant segment and transmits in a VXLAN-encapsulated packet.

Also shown are VTEPs, which are VXLAN tunnel endpoints (VTEP). For example, FIG. 1 shows three VTEPS—VTEP1 110, VTEP2 115, and VTEP3 120. A VTEP typically is a switch with connected end hosts (e.g., Hosts 1-9) that are assigned to virtual networks. The virtual networks map to VXLAN segments. VTEPs perform encapsulation and de-capsulation of VXLAN headers for the traffic between end hosts. A VTEP may also be known as a network virtualization edge (NVE) node.

Consider, by way of illustration, data traffic from Host 2 to Hosts 6 and/or Host 8, which are all members of VLAN12. Host 2 is connected to VTEP1, which encapsulates traffic to the other hosts and sends the traffic on VNI102 through the IP network 105. For Host 6, VTEP2 receives the data, de-encapsulates it, and forwards it to Host 6. Similarly, for Host 8, VTEP3 receives the data, de-encapsulates it, and forwards it to Host 8.

Note that there are two types of ports on a VTEP information handing system. There is an access virtual port, which is a port on a VTEP switch that connects to an end host and may be considered to be part of the overlay network. There is also a network virtual port, which is a port on a VTEP switch that connects to the underlay network. Consider by way of illustration, FIG. 2.

Figure 2:
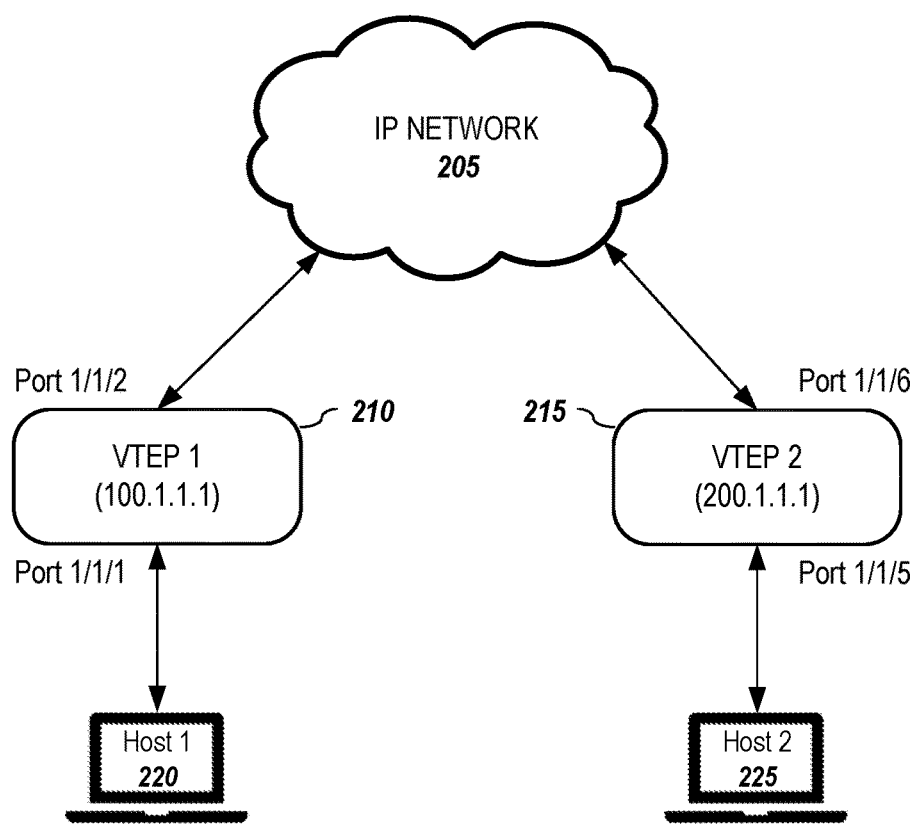
FIG. 2 depicts another example VXLAN topology or network, according to embodiments of the present disclosure.

FIG. 2 depicts an example VXLAN topology or network, according to embodiments of the present disclosure. As illustrated, VTEP1 210 and VTEP2 215 are VXLAN-capable switches. Host 1 220 connected to VTEP1 210 via Port 1/1/1, which is an access port, and VTEP1 connects to the IP network 205 via Port 1/1/2, which is a network port. Similarly, Host 2 225 connected to VTEP2 215 via Port 1/1/5, which is an access port, and VTEP2 connects to the IP network 205 via Port 1/1/6, which is a network port.

In one or more embodiments, a set of identifiers form a key for identifying or accessing a specific port. For example, an access VP key may be defined as port and VLAN. Thus, the access VP keys for FIG. 2 are:

(Port 1/1/1, VLAN ID1)—Access VP1 on VTEP1
(Port 1/1/5, VLAN ID1)—Access VP1 on VTEP2

Similarly, a network VP key may be defined by remote IP address. Thus, the network VP keys for FIG. 2 are:

200.1.1.1 on VTEP1
100.1.1.1 on VTEP2

In current networking chipsets, the programming for virtual ports in VXLAN environments involves creating a source virtual port (VP) (e.g., a virtual port with (port, VLAN) combination) and a VLAN translation table entry, which maps the source port to VNI. In one or more embodiments, the VLAN translation table is a hash table and therefore susceptible to hash collisions. Hash tables are a fast access mechanism used in firmware/hardware (e.g., application specific integrated circuits (ASICs)) for specific tables. For networking, where processing speed is critical, implementing processing aspects, such as look-up tables, in the firmware/hardware of a chip or chips helps increase the speed. Hash tables, however, come with a drawback that some entries might not get programmed in the tables stored in hardware due to the bucket size of the hash table (i.e., memory limit/number of entries limit of the hash table) and the hashing function. The concept of hashing does not differentiate between the types of entries. All entries are treated equally; hence, any entry might be impacted due to hash collision scenarios. This hash collision behavior exists in current ASICs. In the hashing logics that exist today, when a collision occurs and there is no place for an entry in a hash table (or hash bucket, which comprises a set of entries), the entry that was unable to be installed into the hash table due to the collision is noted as being "failed." Even given the latest innovations in hash table programming, the probability of hash collisions increases as table sizes increase. This potential hash collision problem leads to issues where a virtual port may fail to be programmed in the table (which may be referred to as firmware or hardware).

As discussed above, there are two types of virtual ports—access virtual ports and network virtual ports. Since both access VPs and network VPs contend for entries in the VLAN translation hash table, the entries that come in first get programmed and later entries may result in hash collision and not be programmed into the VLAN translation hash table. This issue can disproportionately affect network VPs given that network VPs tend to get programmed later than access VPs. As noted above, the impact of losing a network VP is significantly greater than losing an access VP because loss of an access VP typically leads to disruption of traffic to a device while loss of a network VP impacts traffic to multiple devices.

Because hash collisions may not be avoided in very high-scaled configurations, embodiments mitigate the problem but controlling which entries gets impacted. In one or more embodiments, a priority may be assigned to one or more of the VPs. Thus, if a new VP entry is hashed to a hash table and the hash table is full, the priority may be used to determine which entry is removed in place of the new VP entry or if the new VP entry has too low a priority to be added. In one or more embodiments, network VPs may be assigned a higher priority than access VP. The assignment may be user-defined, may be defined by default, or both.

For example, during network VP programming, assume a hash collision occurs when trying to program into the hash table a network VP, and there is no space for the network VP entry in the hash table. In one or more embodiments, an entry in the hash table that has a lower priority (e.g., a VP associated with a lower priority, such as an access VP) is removed from the hash table and is moved into a failed state. The new VP entry is programmed into the hash table in place of the now-removed entry, as if there had been no hash collision. In this way, the impact of hash collision is controlled.

B. System and Methodology Embodiments

Embodiments comprise novel hashing prioritization processes to differentially consider entries instead treating all potential entries as being equal. The prioritized hashing ensures that highest priority port entries do not fail. When a hash collision occurs during the programming of a higher impact entry, embodiments identify and select a lower priority entry already installed in the hash table in the hardware (i.e., the port chipset), removes it, and places the high priority entry in its place. In this way the impact of collision (which is sometimes referred to as a hardware failure because the entry is not programmed in the hash table in the chipset) is shifted to low priority entry from a high priority entry.

As a differentiator/indicator to emphasize the importance of an entry, a priority value may be assigned. Other factors may be used to determine priority, such as port, prior historical metrics, type of port, configuration of port (e.g., quality of service (QoS), bandwidth, etc.), time, tenant/user, or other factors/metrics. In one or more embodiments, priority may be calculated based upon a formula using one or more factors/indicators as parameters. In one or more embodiments, weights may be applied to the factors/indicators as part of determining priority.

While embodiments may not completely eliminate the hash collision problem, they mitigate the impacts of collisions by prioritizing the installation of entries into the hash table that would result in higher losses over entries in the table that would result in lower losses.

Figure 3:
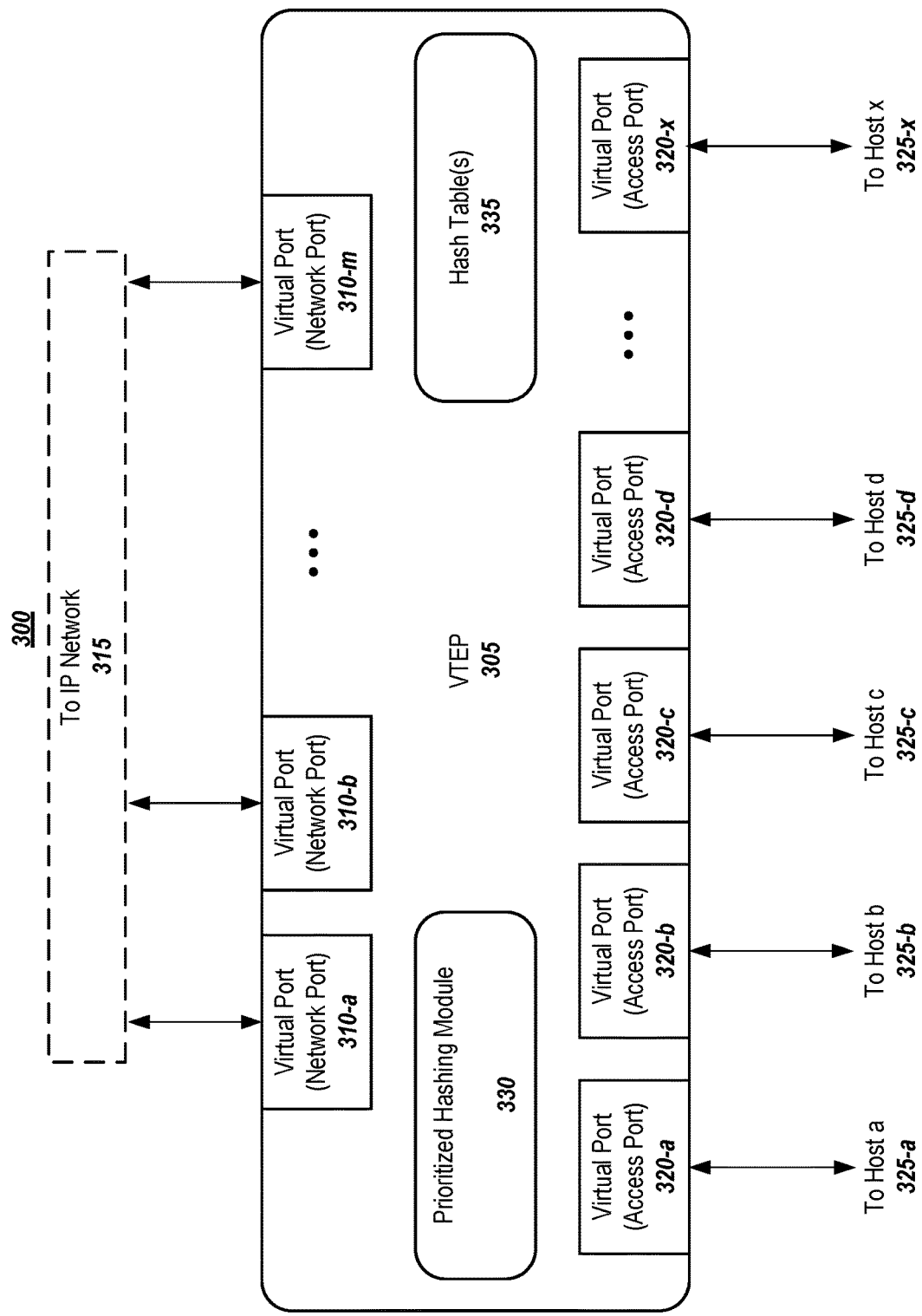
FIG. 3 depicts an example information handling system, according to embodiments of the present disclosure.

FIG. 3 depicts an example information handling system, according to embodiments of the present disclosure. As depicted, the information handling system 305 may be a switch operating as a VTEP. The information handling system 305 comprise a plurality of ports, one or more of which connected to other networking devices (not shown) that facilitate connection to a network (e.g., IP network 315) and one or more of which facilitate connection to one or more end devices (e.g., hosts 325). The information handling system 305 may comprise additional components, such as those depicted in FIGS. 5 and 6, but are not shown here for simplicity.

Figure 4:
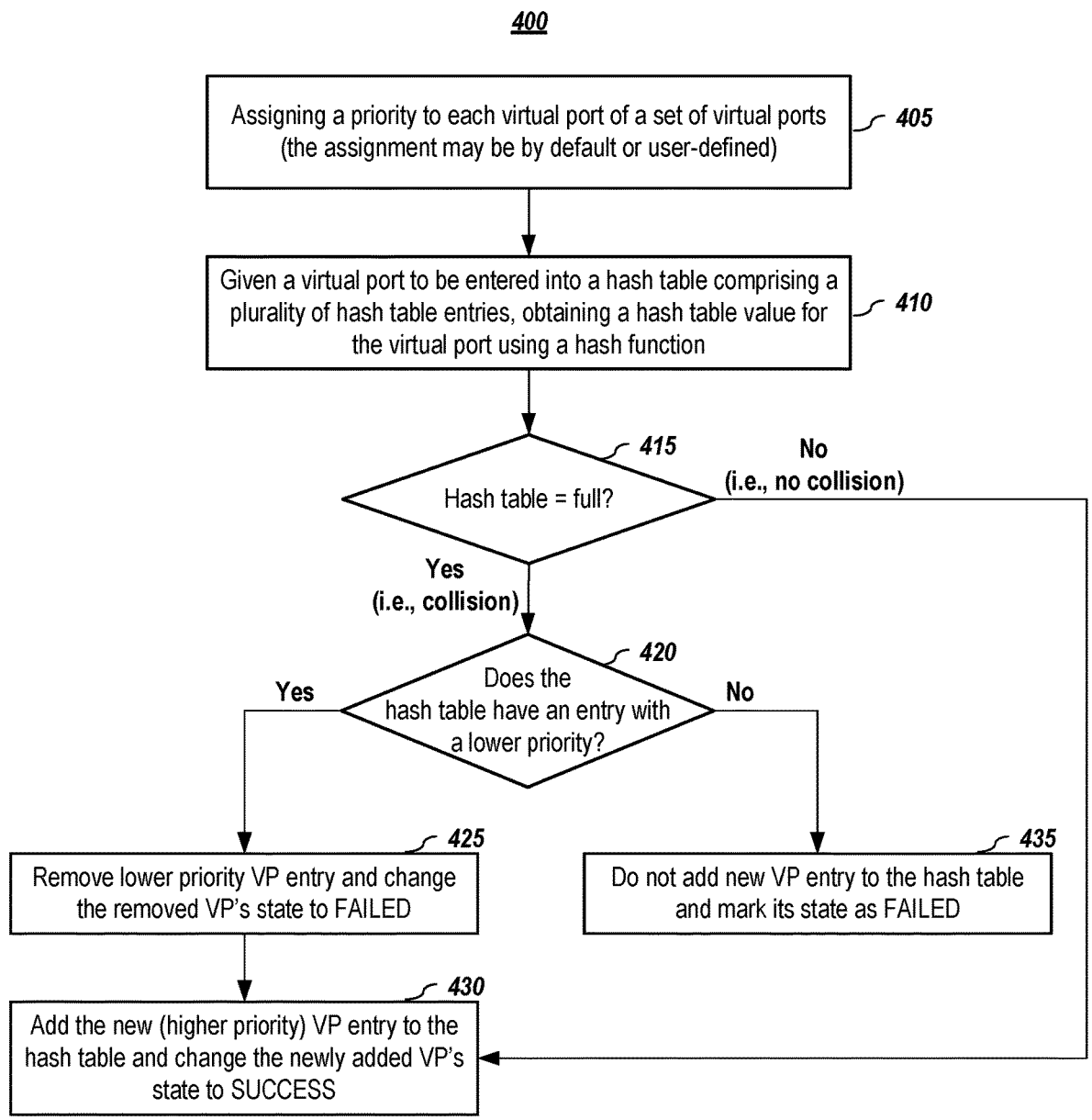
FIG. 4 depicts a methodology that utilizes the prioritized hashing functionality, according to embodiments of the present disclosure.

In one or more embodiments, the information handling system 305 includes hashing and prioritization functions, which may be contained with a module 330 or may be separate functionalities. Also included in the illustrated embodiment is a copy of the hash table(s), which may be stored in memory. FIG. 4 depicts a methodology that utilizes the prioritized hashing functionality (e.g., module 330 and hash table(s) 335), according to embodiments of the present disclosure.

As depicted in FIG. 4, one or more of the virtual ports of the information handling system are assigned or associated with (405) a priority value or indicator. The priority value may be determined as discussed above (e.g., based upon one or more factors). The priority may be set by at least one of the following comprising: by a user, by a default rule or setting, and by using one or more factors related to the virtual port. For example, in one or more embodiments, the priority value of a virtual port may be set by default according to its type, in which network VPs have higher priority than access VPs.

In one or more embodiments, the hash table stored in the hardware/chipset may maintain the associated priority value. However, there may not be sufficient memory to store that priority values in the hardware; thus, in one or more embodiments, a copy of that hash table along with the priority values associated with at least some of the entries in a hash table may be stored in a separate memory (e.g., hash table(s) 335) that is used by the prioritized hashing module to facilitate prioritized hashing processing as described herein. Alternatively, a subset table with priorities linked to the hash table may be used. In one or more embodiments, there may be multiple key fields and different number of value fields in a hash table. Presented below is an example hash table having two key and three value fields that may be maintained—although it should be noted that different data and differently configured table (or tables) may be used:

| Hash Index | Key[1] Field for Hash | Key[2] Field for Hash | Priority | Value[1] Field | Value[2] Field | Value[3] Field | Hit Bit |
|---|---|---|---|---|---|---|---|
| 1000 | VLAN-10 | PORT-5 | 1000 | VP1 | Metadata 1 | Metadata 2 | True |
| 9467 | VLAN-20 | PORT-10 | 50 | VP2 | Metadata 3 | Metadata 4 | False |

In one or more embodiments, the key fields are used for calculating the hash. In this example, the key fields are VLAN and incoming port in which the packet is received. The packets with matching keys would be carry information from the Value Fields as part of metadata. This information may be used in other lookups in the packet pipeline.

In one or more embodiments, given a virtual port comprising virtual port information to be installed into a hash table, which comprises a plurality of hash table entries, a hash table value is obtained (410) using a hashing function. In one or more embodiments, the prioritized hashing module 330 may comprise a hashing function that takes information associated with a virtual port information and generates a hash table entry value into which virtual port information is to be stored. It should be noted that the virtual ports are associated with one or more virtual machines.

Responsive (415) to the hash table having an available hash table entry to store the virtual port information, the information handling system causes (430) the virtual port information to be stored in the hash table. That is, in one or more embodiments, the system 305 installs the information into the hash table in hardware for network processing of data traffic. If there is copy of the hash table stored in software (e.g., hash table 335), the system may also update that hash table. The system may also indicate (430) that the installation of the VP information into the hash table was successful.

In one or more embodiments, responsive (415) to the hash table not having an available hash table entry to store the virtual port information, the information handling system compares (420) a priority value associated with the virtual port with a priority value associated with an entered virtual port that has an entry in the hash table. The information handling system may compare until it finds the first entry with a lower priority value; or alternatively, the information handling system may search to find the VP entry with the lowest priority. In the event that there are two or more entries that have matching lowest priority values, one may be selected at random or one or more other factors may be used as a tie-breaker. Other factors that may be used include: port, prior historical metrics, type of port, configuration of port (e.g., quality of service (QoS), bandwidth, etc.), time, tenant/user, or other factors/metrics. In one or more embodiments, the tie-breaker may be calculated based upon a formula using one or more factors/indicators as parameters. By way of illustration and not limitation, in one or more embodiments, an VP entry with a hit bit cleared is chosen given that it has not been used recently. A hit bit is a field in the VP entry table which indicates whether the VP entry was used for processing network traffic in the data plane. In one or more embodiments, the field is set if it was used, else it remains reset by default. Additionally or alternatively, in one or more embodiments, an access VP with less port statistics may be chosen given it is not frequently used.

In one or more embodiments, when a VP is removed and put in a failed state—such as an access VP which was successfully programmed earlier—the event may be logged. Additionally, a user/administrator may be alerted to the change of state. The alerted administrator may decide to change which VP is removed from the hash table. In one or more embodiments, a schedule may be set to change the priorities of the lowest VP that causes them to rotate or cycle through which ones are moved into a failed state. This way one device or port is not perpetually set in a failed state but is load balanced with other low priority VPs.

If the incoming virtual port has a priority that is higher than at least one virtual port that is entered into the hash table, the entered VP with the lower priority is removed (425) and the virtual port information is installed (430) in the hash table in place of the virtual port that had a lower priority value. It shall be noted that removal of the lower priority VP information may be done by being overwritten with the VP information that has a higher priority or may first be removed to create an empty entry. In one or more embodiments, the VP with the lower priority, which was removed from the hash table, may have its state designated as "failed" since it is no longer programmed in the hash table; similarly, the newly added VP may be designated as "success" to indicate that it was successfully added to the hash table.

If the virtual port does not have a priority higher than any of the existing virtual ports that are entered into the hash table, then the virtual port information is not installed (435) into the hash table. In one or more embodiments, it may be noted that installation of that VP may be noted as having "failed."

In one or more embodiments, a user-level command, such as a command line interface (CLI) command (e.g., Dell#show virtual-port status), may be used to describe or identify the hardware state of the VPs. Presented below is an example output that may be returned:

| Type | Port/Remote IP | VLAN | State |
|---|---|---|---|
| Access | 1 | 10 | SUCCESS |
| Access | 2 | 10 | SUCCESS |
| Networks | 10.10.10.10 | 20 | SUCCESS |
| Access | 3 | 10 | FAILED |

As noted above, a user may be allowed to set the priority of a port or ports. For example, users may be given a CLI option to give priority to access VP. For example, the network VPs may have high priority at 100, which (in one or more embodiments) may or may not be modified, and access VPs may have priorities ranging from 0-99, which can be set by the user on an access VP-by-access VP basis, if desired, and the default access VP priority may be low, such as 0.

One skilled in the art shall recognize that, through embodiments disclosed herein, the impact of hash collisions can be reduced based on a priority concept. Currently, there are no priorities and thus any VP can be impacted and the probability for network VP is high given that they get programmed at a later stage than access VP. With priority-based embodiments, the impact can be pre-determined, and even among access VPs the higher priority entries can be saved from impact.

C. Information Handling System Embodiments

In one or more embodiments, aspects of the present patent document may be directed to, may include, or may be implemented on one or more information handling systems (or computing systems). An information handling system/computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, mobile device (e.g., personal digital assistant (PDA), smart phone, phablet, tablet, etc.), smart watch, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, read only memory (ROM), and/or other types of memory. Additional components of the computing system may include one or more drives (e.g., hard disk drives, solid state drive, or both), one or more network ports for communicating with external devices as well as various input and output (I/O) devices, such as a keyboard, mouse, stylus, touchscreen, and/or video display. The computing system may also include one or more buses operable to transmit communications between the various hardware components.

Figure 5:
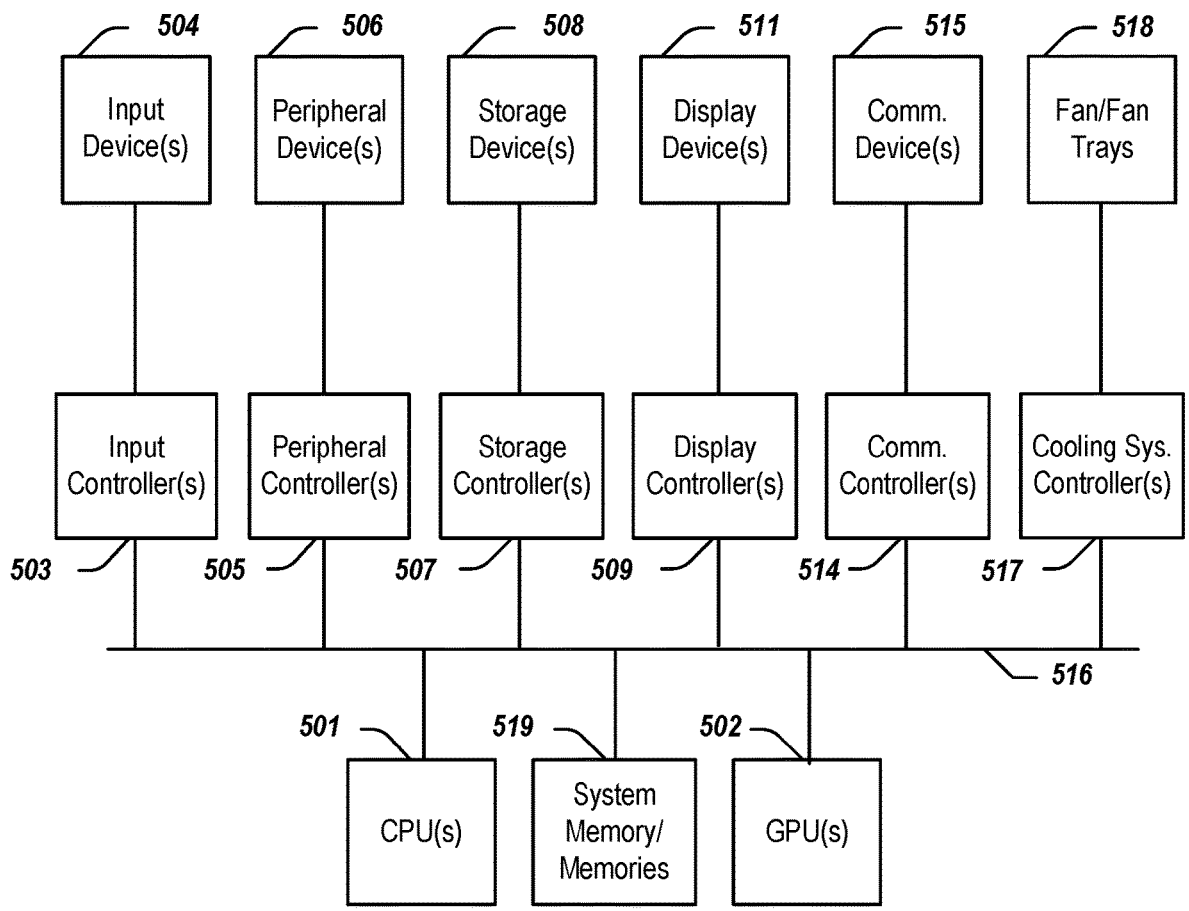
FIG. 5 depicts a simplified block diagram of an information handling system, according to embodiments of the present disclosure.

FIG. 5 depicts a simplified block diagram of an information handling system (or computing system), according to embodiments of the present disclosure. It will be understood that the functionalities shown for system 500 may operate to support various embodiments of a computing system—although it shall be understood that a computing system may be differently configured and include different components, including having fewer or more components as depicted in FIG. 5.

As illustrated in FIG. 5, the computing system 500 includes one or more central processing units (CPU) 501 that provides computing resources and controls the computer. CPU 501 may be implemented with a microprocessor or the like and may also include one or more graphics processing units (GPU) 502 and/or a floating-point coprocessor for mathematical computations. In one or more embodiments, one or more GPUs 502 may be incorporated within the display controller 509, such as part of a graphics card or cards. The system 500 may also include a system memory 519, which may comprise RAM, ROM, or both.

A number of controllers and peripheral devices may also be provided, as shown in FIG. 5. An input controller 503 represents an interface to various input device(s) 504, such as a keyboard, mouse, touchscreen, and/or stylus. The computing system 500 may also include a storage controller 507 for interfacing with one or more storage devices 508 each of which includes a storage medium such as magnetic tape or disk, or an optical medium that might be used to record programs of instructions for operating systems, utilities, and applications, which may include embodiments of programs that implement various aspects of the present disclosure. Storage device(s) 508 may also be used to store processed data or data to be processed in accordance with the disclosure. The system 500 may also include a display controller 509 for providing an interface to a display device 511, which may be a cathode ray tube (CRT) display, a thin film transistor (TFT) display, organic light-emitting diode, electroluminescent panel, plasma panel, or any other type of display. The computing system 500 may also include one or more peripheral controllers or interfaces 505 for one or more peripherals 506. Examples of peripherals may include one or more printers, scanners, input devices, output devices, sensors, and the like. A communications controller 514 may interface with one or more communication devices 515, which enables the system 500 to connect to remote devices through any of a variety of networks including the Internet, a cloud resource (e.g., an Ethernet cloud, a Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals. As shown in the depicted embodiment, the computing system 500 comprises one or more fans or fan trays 518 and a cooling subsystem controller or controllers 517 that monitors thermal temperature(s) of the system 500 (or components thereof) and operates the fans/fan trays 518 to help regulate the temperature.

In the illustrated system, all major system components may connect to a bus 516, which may represent more than one physical bus. However, various system components may or may not be in physical proximity to one another. For example, input data and/or output data may be remotely transmitted from one physical location to another. In addition, programs that implement various aspects of the disclosure may be accessed from a remote location (e.g., a server) over a network. Such data and/or programs may be conveyed through any of a variety of machine-readable medium including, for example: magnetic media such as hard disks, floppy disks, and magnetic tape; optical media such as compact discs (CDs) and holographic devices; magneto-optical media; and hardware devices that are specially configured to store or to store and execute program code, such as application specific integrated circuits (ASICs), programmable logic devices (PLDs), flash memory devices, other non-volatile memory (NVM) devices (such as 3D XPoint-based devices), and ROM and RAM devices.

Figure 6:
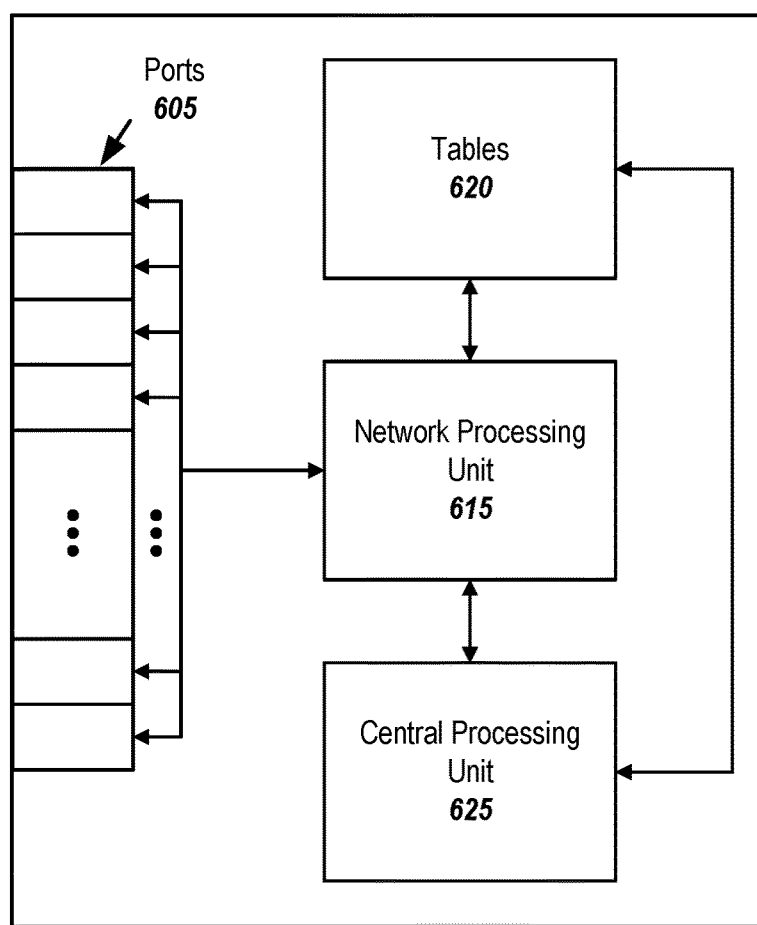
FIG. 6 depicts an alternative block diagram of an information handling system, according to embodiments of the present disclosure.

FIG. 6 depicts an alternative block diagram of an information handling system, according to embodiments of the present disclosure. It will be understood that the functionalities shown for system 600 may operate to support various embodiments of the present disclosure—although it shall be understood that such system may be differently configured and include different components, additional components, or fewer components.

The information handling system 600 may include a plurality of I/O ports 605, a network processing unit (NPU)

615, one or more tables 620, and a central processing unit (CPU) 625. The system includes a power supply (not shown) and may also include other components, which are not shown for sake of simplicity.

In one or more embodiments, the I/O ports 605 may be connected via one or more cables to one or more other network devices or clients. The network processing unit 615 may use information included in the network data received at the node 600, as well as information stored in the tables 620, to identify a next device for the network data, among other possible activities. In one or more embodiments, a switching fabric may then schedule the network data for propagation through the node to an egress port for transmission to the next destination.

Aspects of the present disclosure may be encoded upon one or more non-transitory computer-readable media with instructions for one or more processors or processing units to cause steps to be performed. It shall be noted that the one or more non-transitory computer-readable media shall include volatile and/or non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that have computer code thereon for performing various computer-implemented operations. The media and computer code may be those specially designed and constructed for the purposes of the present disclosure, or they may be of the kind known or available to those having skill in the relevant arts. Examples of tangible computer-readable media include, for example: magnetic media such as hard disks, floppy disks, and magnetic tape; optical media such as CDs and holographic devices; magneto-optical media; and hardware devices that are specially configured to store or to store and execute program code, such as ASICs, programmable logic devices (PLDs), flash memory devices, other non-volatile memory (NVM) devices (such as 3D XPoint-based devices), and ROM and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into modules and/or sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. An information-handling-system-implemented method comprising:
given a virtual port comprising virtual port information to be entered into a hash table, which comprises a plurality of hash table entries that are stored in a processor-readable memory with a limited capacity to store hash table entries of an information handling system that processes network data traffic, obtaining a hash table value using a hashing function that indicates a hash table entry value into which the virtual port information is to be stored;
responsive to the hash table having an available hash table entry in the processor-readable memory to store the virtual port information, causing the virtual port information to be stored in the hash table;
responsive to the hash table not having an available hash table entry in the processor-readable memory to store the virtual port information:
comparing a priority indicator associated with the virtual port with a priority indicator associated with an entered virtual port that has an entry in the hash table, in which an entry comprises a virtual port identifier that represents the corresponding virtual port and comprises a priority indicator associated with the corresponding virtual port, in which the priority indicator represents one or more factors related to the virtual port and at least one of the one or more factors is its type as either an access port or a network port;
responsive to the virtual port having a priority higher than the entered virtual port that is entered into the hash table, causing the virtual port information to be stored in the hash table in place of the entered virtual port that has a lower priority indicator; and
responsive to the virtual port not having a priority higher than any of the entered virtual ports that are entered into the hash table, not causing the virtual port information to be stored in the hash table; and
using at least one or more hash table entries in the hash table to process data traffic.

2. The information-handling-system-implemented method of claim 1 further comprising:
for at least one entered virtual port in the hash table, updating its priority indicator associated with the entered virtual port based upon one or more factors related to the entered virtual port.

3. The information-handling-system-implemented method of claim 1 further comprising:
maintaining a copy of that hash table and priority indicators associated with at least some of the entries in a hash table; and
wherein the step of comparing a priority indicator associated with the virtual port with a priority indicator associated with an entered virtual port that has an entry in the hash table is performed using the copy of the hash table with the priority indicators associated with at least some of the entries in a hash table.

4. The information-handling-system-implemented method of claim 1 wherein the step of causing the virtual port information to be stored in the hash table in place of the entered virtual port that has a lower priority indicator comprises:
 causing the virtual port information to be stored in the hash table in place of the entered virtual port that has a lower priority indicator;
 marking a status indicator of the virtual port as being successfully entered into the hash table; and
 marking a status indicator of the entered virtual port that has a lower priority indicator as not being entered into the hash table.

5. The information-handling-system-implemented method of claim 1 wherein the step of responsive to the virtual port not having a priority higher than any of the entered virtual ports that are entered into the hash table, not causing the virtual port information to be stored in the hash table further comprises:
 marking a status indicator of the virtual port as not being successfully entered into the hash table.

6. The information-handling-system-implemented method of claim 1 wherein the step of comparing a priority indicator associated with the virtual port with a priority indicator associated with an entered virtual port that has an entry in the hash table, in which an entry comprises a virtual port identifier that represents the corresponding virtual port and comprises a priority associated with the corresponding virtual port comprises:
 identifying an entered virtual port in the hash table that is associated with a lowest priority indicator from among the entered virtual ports in the hash table; and
 comparing the priority indicator associated with the virtual port with the priority indicator associated with the entered virtual port that has the lowest priority.

7. An information handling system comprising:
 a plurality of ports for connecting the information handling system to one or more other information handling systems;
 one or more processors communicatively coupled to the one or more ports; and
 a non-transitory computer-readable medium or media comprising one or more sets of instructions which, when executed by at least one of the one or more processors, causes steps to be performed comprising:
  given a virtual port comprising virtual port information to be entered into a hash table, which comprises a plurality of hash table entries that are stored in a processor-readable memory with a limited capacity to store hash table entries, obtaining a hash table value using a hashing function that indicates a hash table entry value;
  responsive to the hash table having an available hash table entry in the processor-readable memory to store the virtual port information, causing the virtual port information to be stored in the hash table;
  responsive to the hash table not having an available hash table entry in the processor-readable memory to store the virtual port information:
   comparing a priority value associated with the virtual port with a priority value associated with an entered virtual port that has an entry in the hash table, in which an entry comprises a virtual port identifier that represents the corresponding virtual port and comprises a priority associated with the corresponding virtual port, in which the priority value represents one or more factors related to the virtual port and at least one of the one or more factors is its type as either an access port or a network port;
   responsive to the virtual port having a priority higher than the entered virtual port that is entered into the hash table, causing the virtual port information to be stored in the hash table in place of the entered virtual port that has a lower priority value; and
   responsive to the virtual port not having a priority higher than any of the entered virtual ports that are entered into the hash table, not causing the virtual port information to be stored in the hash table; and
  using at least one or more hash table entries in the hash table to process data traffic.

8. The information handling system of claim 7 wherein the priority value of a virtual port is set by at least one of the following comprising:
 by a user; and
 by one or more rules or settings that use at least one factor from the set of one or more factors.

9. The information handling system of claim 7 where in the non-transitory computer-readable medium or media further comprises one or more sets of instructions which, when executed by at least one of the one or more processors, further causes steps to be performed comprising:
 maintaining a copy of that hash table and priority values associated with at least some of the entries in a hash table; and
 wherein the step of comparing a priority value associated with the virtual port with a priority value associated with an entered virtual port that has an entry in the hash table is performed using the copy of the hash table with the priority values associated with at least some of the entries in a hash table.

10. The information handling system of claim 7 wherein the step of causing the virtual port information to be stored in the hash table in place of the entered virtual port that has a lower priority value comprises:
 causing the virtual port information to be stored in the hash table in place of the entered virtual port that has a lower priority value;
 marking a status indicator of the virtual port as being successfully entered into the hash table; and
 marking a status indicator of the entered virtual port that has a lower priority value as not being entered into the hash table.

11. The information handling system of claim 7 wherein the step of responsive to the virtual port not having a priority higher than any of the entered virtual ports that are entered into the hash table, not causing the virtual port information to be stored in the hash table further comprises:
 marking a status indicator of the virtual port as not being successfully entered into the hash table.

12. The information handling system of claim 7 wherein the step of comparing a priority value associated with the virtual port with a priority value associated with an entered virtual port that has an entry in the hash table, in which an entry comprises a virtual port identifier that represents the corresponding virtual port and comprises a priority associated with the corresponding virtual port comprises:
 identifying an entered virtual port in the hash table that is associated with a lowest priority value from among the entered virtual ports in the hash table; and comparing the priority value associated with the virtual port with the priority value associated with the entered virtual port that has the lowest priority.

13. A non-transitory computer-readable medium or media comprising one or more sequences of instructions which, when executed by at least one processor, causes steps to be performed comprising:

given a virtual port comprising virtual port information to be entered into a hash table, which comprises a plurality of hash table entries that are stored in a processor-readable memory with a limited capacity to store hash table entries of an information handling system that processes network data traffic, obtaining a hash table value using a hashing function that indicates a hash table entry value into which the virtual port information is to be stored;

responsive to the hash table having an available hash table entry in the processor-readable memory to store the virtual port information, causing the virtual port information to be stored in the hash table;

responsive to the hash table not having an available hash table entry in the processor-readable memory to store the virtual port information:

comparing a priority indicator associated with the virtual port with a priority indicator associated with an entered virtual port that has an entry in the hash table, in which an entry comprises a virtual port identifier that represents the corresponding virtual port and comprises a priority indicator associated with the corresponding virtual port, in which the priority indicator represents one or more factors related to the virtual port and at least one of the one or more factors is its type as either an access port or a network port;

responsive to the virtual port having a priority higher than the entered virtual port that is entered into the hash table, causing the virtual port information to be stored in the hash table in place of the entered virtual port that has a lower priority indicator; and responsive to the virtual port not having a priority higher than any of the entered virtual ports that are entered into the hash table, not causing the virtual port information to be stored in the hash table; and using at least one or more hash table entries in the hash table to process data traffic.

14. The non-transitory computer-readable medium or media of claim 13 further comprising one or more sequences of instructions which, when executed by at least one processor, causes steps to be performed comprising:

maintaining a copy of that hash table and priority indicators associated with at least some of the entries in a hash table; and wherein the step of comparing a priority indicator associated with the virtual port with a priority indicator associated with an entered virtual port that has an entry in the hash table is performed using the copy of the hash table with the priority indicators associated with at least some of the entries in a hash table.

15. The non-transitory computer-readable medium or media of claim 13 wherein the step of causing the virtual port information to be stored in the hash table in place of the entered virtual port that has a lower priority indicator comprises:

causing the virtual port information to be stored in the hash table in place of the entered virtual port that has a lower priority indicator;

marking a status indicator of the virtual port as being successfully entered into the hash table; and marking a status indicator of the entered virtual port that has a lower priority value as not being entered into the hash table.

16. The non-transitory computer-readable medium or media of claim 13 wherein the step of responsive to the virtual port not having a priority higher than any of the entered virtual ports that are entered into the hash table, not causing the virtual port information to be stored in the hash table further comprises:

marking a status indicator of the virtual port as not being successfully entered into the hash table.

17. The non-transitory computer-readable medium or media of claim 13 wherein the step of comparing a priority indicator associated with the virtual port with a priority indicator associated with an entered virtual port that has an entry in the hash table, in which an entry comprises a virtual port identifier that represents the corresponding virtual port and comprises a priority associated with the corresponding virtual port comprises:

identifying an entered virtual port in the hash table that is associated with a lowest priority indicator from among the entered virtual ports in the hash table; and comparing the priority indicator associated with the virtual port with the priority indicator associated with the entered virtual port that has the lowest priority.

18. The information-handling-system-implemented method of claim 1 wherein at least one of the one or more factors for setting the priority indicator is related to data traffic usage via the virtual port.

19. The information-handling-system-implemented method of claim 5 further comprising the steps of:

responsive to the virtual port that has the status indicator as not being successfully entered into the hash table having had that status indicator for a set amount of time or until a condition has occurred, causing the virtual port to be stored into the hash table even if it has a priority indicator that is lower than the priority indicators associated with the entered virtual ports in the hash table.

20. The information handling system of claim 7 wherein at least one of the one or more factors for setting the priority value is related to data traffic usage via the virtual port.

* * * * *